United States Patent [19]

Armbruster et al.

[11] 4,203,020

[45] May 13, 1980

[54] METHOD OF RESISTANCE WELDING WIRES TO A MASSIVE WORKPIECE

[75] Inventors: Franz Armbruster, Stuttgart; Albano Paoli, Mühlacker; Gerd Bässler, Kornwestheim; Hans-Peter Sitka, Ludwigsburg; Günter Schmidt, Reutlingen, all of Fed. Rep. of Germany

[73] Assignee: Robert Bosch GmbH, Stuttgart, Fed. Rep. of Germany

[21] Appl. No.: 908,931

[22] Filed: May 24, 1978

[30] Foreign Application Priority Data

Jul. 7, 1977 [DE] Fed. Rep. of Germany ....... 2725564

[51] Int. Cl.² ............................................. B23K 11/14
[52] U.S. Cl. .................................. 219/93; 219/56.22; 219/118
[58] Field of Search ............... 219/78.01, 93, 56, 56.1, 219/56.21, 56.22, 118

[56] References Cited

U.S. PATENT DOCUMENTS

| | | | |
|---|---|---|---|
| 928,701 | 7/1909 | Rietzel | 219/93 |
| 1,665,851 | 4/1928 | Harris | 219/59.1 |
| 2,395,373 | 2/1946 | Johnson | 219/118 X |
| 3,118,049 | 1/1964 | Gros | 219/93 |
| 3,346,350 | 10/1967 | Spooner | 219/93 X |
| 3,786,172 | 1/1974 | Cowley | 219/118 X |

FOREIGN PATENT DOCUMENTS

927955 6/1963 United Kingdom ....................... 219/93
1018873 2/1966 United Kingdom .

*Primary Examiner*—E. A. Goldberg
*Attorney, Agent, or Firm*—Frishauf, Holtz, Goodman & Woodward

[57] ABSTRACT

A method for producing strong resistance-welded joints between wires and massive workpieces, especially welded joints between nickel-plated copper wires and steel workpieces. The melting of the nickel coating is insured by producing locally high temperatures and pressures, due to the special configuration of the surface of the workpiece. The work surface is provided with bulges or protrusions which cause a concentration of electrical current and electrode pressure.

14 Claims, 3 Drawing Figures

METHOD OF RESISTANCE WELDING WIRES TO A MASSIVE WORKPIECE

The present invention relates to a method for joining coated electrical wires, especially nickel-coated copper wires, to workpieces by resistance welding. More particularly, the invention relates to a method for resistance welding of wires to workpieces in which the workpieces are shaped and configured to enhance the welding process.

BACKGROUND OF THE INVENTION AND PRIOR ART

In the process of resistance welding of workpieces, the members to be joined are heated by the passage of a strong electrical current in the area of the intended joint and are pressed together in that area while soft and plastic. Almost all metallic objects can be welded together in this manner, provided only tht they exhibit a sufficiently high degree of electrical conductivity. However, the welding of objects made from non-ferrous metals presents special problems due to their often very high electrical conductivity which requires the use of very heavy currents to generate the necessary heat. The high thermal conductivity of these metals places limits on the duration of current flow so as to prevent an undesired spreading of the heat to other parts of the workpiece. These problems occur especially when thin copper wires are to be welded to relatively massive steel workpieces. The different melting points of copper and steel make it necessary that the heat of welding be kept within relatively narrow limits so as to ensure adequate commingling of metal by welding while preventing excessive deformation of the copper wire in the area of the weld. Various surface treatments have been proposed but these all strongly affect the welding process and thus require adjustment of the welding variables, i.e. the pressure, the current and the duration. It has been proposed to improve the weldability of copper wires by coating them with a layer of tin or cadmium in order to increase the transition resistance at the welding point but it has been found that these coatings require reduced welding currents and, in some cases, special welding electrode materials. More recently, copper wires have been coated with a surface layer of nickel. Such a coating further reduces the weldability of the wires due to the substantially higher melting point of nickel as compared with that of copper. Thus, it is known from British Pat. No. 1,018,873 to coat copper wires and plates with a layer of nickel prior to joining by resistance welding. It is the purpose of the nickel layer to prevent melting of the copper in the area of contact of the electrodes and thus to prevent adhesion to the welding electrodes.

SUMMARY OF THE INVENTION

It is an object of the present invention to provide a method for joining coated wires to workpieces by resistance welding. In particular, it is an object of the present invention to join nickel-coated wires to workpieces whose melting point is higher than that of the primary wire material. The method of the invention includes welding wires to workpieces having corrosion-preventing surface layers.

Briefly, the method of the present invention provides that the surface of the workpiece has a bulge or bulges in the area of the intended weld. The bulge may be a single, relatively large protrusion on which the wire to be welded is placed or there may be a number of adjacent protrusions. The bulges may also be a plurality of small protrusions, forming a checker-board pattern, for example. The special configuration of the welding surface according to the present invention produces welded joints of, especially, nickel-coated wires to workpieces whose strength is from 30 to 40% higher than joints made without the special surface bulges. The method of the present invention has been found to be particularly suitable for welding copper wires with a nickel coating of up to 20 $\mu$m to a workpiece of steel having an anti-corrosion layer of cadmium or the like. When the surface is showed in the manner of a checker-board pattern, with individual pyramid-shaped protrusions, there results a very favorable local concentration of welding current and electrode pressure, causing melting of the nickel layer of the copper wire, uniform contact and a reliable weld. The multiple bulges in the surface, in the manner of a knurl, thus permit reliable welding of the nickel-coated wire to the workpiece without additional surface treatment of the wire, due to local melting of the nickel layer.

The invention will now be described by way of preferred examples with reference to the accompanying drawing.

THE DRAWING

DETAILED DESCRIPTION OF THE INVENTION

Figure 1:
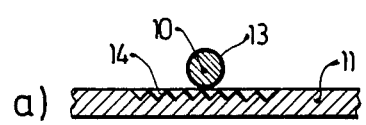
FIG. 1 illustrates various views of the surface of a workpiece configured in the manner of one embodiment of the present invention.
Figure 1:
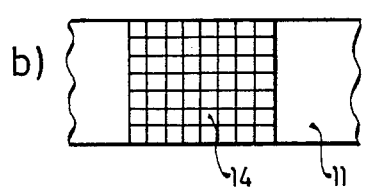
Figure 1:
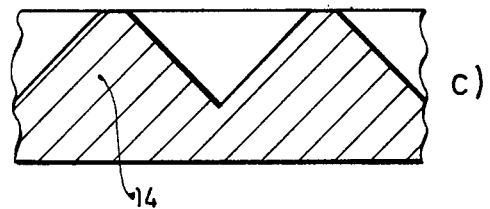

In FIG. 1 a, there is shown a copper wire 10 coated with layer of nickel 13. The wire, which may, for example, be the connecting wire for a diode or the like, may, typically, have a copper core of a diameter of 0.8–1.0 mm while the thickness of the nickel layer may be as great as 20 $\mu$m. The wire 10 is shown atop a workpiece 11, for example a current conductor bus, made of steel. Prior to being coated with a corrosion-resistant layerof cadmium or a similar material, the surface of the workpiece 11 is provided with a pattern of bulges or protrusions 14, for example by stamping or embossing. The height of the bulges or protrusions does not exceed the thickness of the wire and, indeed, may be much less (FIG. 1a). As illustrated in FIG. 1b, the protrusions may be arranged in a checker-board pattern, each of the protrusions being substantially pyramidal, as shown enlarged in FIG. 1c. After application of the surface pattern, the surface of the workpiece may be coated with an anti-corrosive layer. The nickel-coated copper wire is then placed on the surface pattern of the workpiece and the two members are joined by resistance welding. The points of the protrusions serve to concentrate the current density and the local pressure, causing the nickel layer to melt and insuring the strength of the welded joint. Suitably, the area of an individual pyramidal protrusion is approx. ~5×10 mm.

Figure 2:
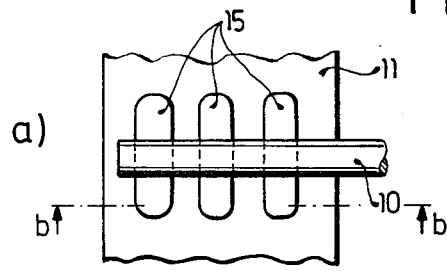
FIG. 2 illustrates two views of the surface configuration in a second embodiment of the invention.
Figure 2:
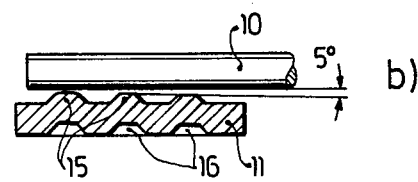

A second embodiment of the method of the invention is illustrated in FIG. 2. In this example, the bulges 15 of the workpiece are relatively larger and fewer than in the example of FIG. 1. The bulges 15 are preferably formed by stamping, resulting in the formation of an opposite depression 16. The length of the bulges 15, extending transversely to the wire 10 has been found to be suitably approximately 4 mm. As illustrated in FIG. 1b, the height of the bulges 15 above the surface of the workpiece 11 all less then the thickness of the wire 10 may advantageously be reduced from one bulge to the next in the direction of the length of the wire 10. Suitably, the height of the bulges decreases at an angle of approx. 5° with respect to the surface. The progressive decrease of the height of the bulges 15 results in a successive welding of the wire to the bulges 15 and causes a concentration of the welding current while causing progressively less wire deformation in the axial direction. The depressions 16, which are formed during the stamping of the workpiece 11, act as heat reservoirs and increase the temperature of the weld area during the welding process.

Figure 3:
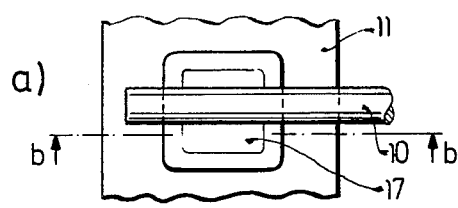
FIG. 3 illustrates two views of a third embodiment of the invention.
Figure 3:
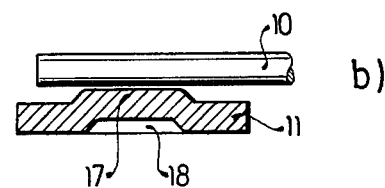

A third suitable configuration of the surface of the workpiece is illustrated in FIG. 3. In this example, the bulge is a single, substantially square raised portion 17 having an approximately length of 3-4 mm on each side. During the stamping, there is formed an opposite depression 18, which serves as a heat reservoir during the welding process. The stored heat, in conjunction with the high electrical resistance and relatively low thermal conductivity of the nickel, results in very strong heating of the nickel layer in the area of contact. As a result, the nickel layer of the copper wire melts and a thorough commingling of metals produces a reliable and strong weld.

We claim:

1. A method of joining a wire comprising a core of highly thermally and electrically conductive material, and a coating (13) consisting of a metal with a melting point which is substantially higher than the melting point of the core of said wire,
   and a massive workpiece of a material having a melting point which is substantially higher than that of the core of the wire by resistance welding, comprising the steps of
   providing the surface of a workpiece (11) with at least one bulge or protrusion in the area of the intended weld;
   placing said coated wire on the bulge or protrusion of said workpiece
   performing a resistance welding operation on said wire placed on the bulge or protrusion of said workpiece, the bulge or protrusion restricting dissipation of welding heat throughout the workpiece and concentration of said welding heat at the contact area of the coating and the workpiece and preventing melting of the wire core before effecting the weld connection of the coating with the workpiece.

2. A method according to claim 1, wherein the core of said wire (10) is copper (wire having) and the coating is a nickel coating (13) of thickness less than 20 μm and wherein said workpiece is made of steel.

3. A method according to claim 1, comprising the further step of:
   applying to said workpiece a surface layer of a corrosion-resistant material after performing the step of providing said at least one bulge.

4. A method according to claim 1, wherein said at least one bulge is a plurality of adjacent protrusions (14) forming a knurl-like pattern.

5. A method according to claim 4, wherein said protrusions are substantially pyramidal-shaped.

6. A method according to claim 1, wherein said at least one bulge is a plurality of elongated bulges 815), of successively decreasing height above the surface of said workpiece in one direction thereof.

7. A method according to claim 6, wherein the tops of said bulges define an angle of approx. 5° with respect to the surface of said workpiece.

8. A method according to claim 6, wherein said bulges are formed by stamping and wherein there is produced a depression (16) on the opposite side of the workpiece from each bulge.

9. A method according to claim 1, wherein said at least one bulge is a single, substantially square protrusion formed by stamping, there being produced a depression (18) on the opposite side of the workpiece from said bulge.

10. A method according to claim 1, wherein said workpiece is made of steel coated with an anti-corrosion layer of cadmium.

11. Method according to claim 1, wherein the height of the bulge or protrusion formed on the workpiece is less than the thickness of the wire.

12. Method according to claim 4, wherein the height of the adjacent protrusions (14) forming the knurl-like pattern is less than the thickness of the wire.

13. Method according to claim 1, wherein a plurality of elongated bulges (15) are provided having a height less than the thickness of the wire, said bulges extending essentially transversely to the longitudinal direction of the wire at the region of the resistance weld.

14. Method according to claim 9, wherein the height of the bulge or protrusion formed on the workpiece is less than the thickness of the wire.

* * * * *